United States Patent
Jang et al.

(10) Patent No.: US 11,056,693 B2
(45) Date of Patent: Jul. 6, 2021

(54) ARYNE-GRAFTED CARBON-SUPPORTED ELECTROCATALYST AND PROCESS OF PREPARING THE SAME

(71) Applicant: KOREA INSTITUTE OF SCIENCE AND TECHNOLOGY, Seoul (KR)

(72) Inventors: Jong Hyun Jang, Seoul (KR); Hee-Young Park, Seoul (KR); Hyoung-Juhn Kim, Seoul (KR); Dirk Henkensmeier, Seoul (KR); Sung Jong Yoo, Seoul (KR); Jin Young Kim, Seoul (KR); So Young Lee, Seoul (KR); Hyun Seo Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 217 days.

(21) Appl. No.: 15/879,237

(22) Filed: Jan. 24, 2018

(65) Prior Publication Data
US 2019/0074523 A1  Mar. 7, 2019

(30) Foreign Application Priority Data
Sep. 6, 2017  (KR) .................. 10-2017-0113702

(51) Int. Cl.
*H01M 4/90* (2006.01)
*H01M 4/88* (2006.01)

(52) U.S. Cl.
CPC ....... *H01M 4/9008* (2013.01); *H01M 4/8825* (2013.01); *H01M 4/9083* (2013.01)

(58) Field of Classification Search
None
See application file for complete search history.

(56) References Cited

PUBLICATIONS

Li et al. Carbon, 48, 255-279 (Year: 2010).*
Nikolaos Karousis et al., "Structure, Properties, Functionalization, and Applications of Carbon Nanohorns", Chemical Reviews, 2016, pp. 4850-4883, vol. 116.
Xing Zhong et al., "Aryne cycloaddition: highly efficient chemical modification of graphene", Chem. Commun., 2010, pp. 7340-7342, vol. 46.
Zhongxin Song et al., "Atomic layer deposited tantalum oxide to anchor Pt/C for a highly stable catalyst in PEMFCs", Journal of Materials Chemistry A, 2017, pp. 9760-9767, vol. 5.

\* cited by examiner

*Primary Examiner* — Yun Qian
(74) *Attorney, Agent, or Firm* — Rabin & Berdo, P.C.

(57) ABSTRACT

An aryne-grafted carbon-supported catalyst and a method of preparing the same, and particularly to a carbon-supported catalyst having an organic anchor formed on the surface of a carbon support through aryne cycloaddition in order to improve the durability of a fuel cell catalyst, and a method of preparing the same. It is possible to form a covalent bonding selectively to a carbon support of a fuel cell catalyst in a solution by using 2-(trimethylsilyl)phenyl triflate or the like. In addition, the formed anchor prevents adhesion of metal catalyst particles of a fuel cell, and thus improves the durability of a fuel cell catalyst.

2 Claims, 6 Drawing Sheets

ARYNE-GRAFTED CARBON-SUPPORTED ELECTROCATALYST AND PROCESS OF PREPARING THE SAME

CROSS-REFERENCE TO RELATED APPLICATIONS

This application claims, under 35 U.S.C. § 119, the priority of Korean Patent Application No. 10-2017-0113702 filed on Sep. 6, 2017 in the Korean Intellectual Property Office, the disclosure of which is incorporated herein by reference in its entirety.

TECHNICAL FIELD

The following disclosure relates to an aryne-grafted carbon-supported catalyst and a method of preparing the same. Particularly, the following disclosure relates to a carbon-supported catalyst having organic anchors formed on the surface of a carbon support through aryne cycloaddition in order to improve the durability of a fuel cell catalyst, and a method of preparing the same.

BACKGROUND

It is known that agglomeration of metal nanoparticles of a catalyst, particularly agglomeration of platinum nanoparticles is one of the causes of degradation of fuel cell activity. To prevent such agglomeration of nanoparticles, treatment capable of limiting transportability of nanoparticles in a catalyst is required.

According to the related art, a method of forming an inorganic anchor selectively on a carbon support has been reported (J. Mater. Chem. A 5 (2017) 9760). However, the above method requires a vacuum deposition process and thus is limited in that it is difficult to apply mass production.

REFERENCES

Non-Patent Documents

1. J. Mater. Chem. A 5 (2017) 9760
2. Xing Zhong et al., "Aryne cycloaddition: highly efficient chemical modification of graphene", Chem. Commun., 46 (2010) 7340-7342

SUMMARY

The present disclosure is designed to solve the problems of the related art, and an embodiment of the present disclosure is directed to providing a carbon-supported catalyst which prevents agglomeration of metal catalyst nanoparticles of a fuel cell to improve the durability of a fuel cell, and a method of preparing the same.

In one aspect, there is provided an aryne-grafted carbon-supported catalyst including a carbon support and a plurality of metal catalysts supported on the carbon support, wherein a plurality of arynes is grafted to the carbon support to form a structure bound to the carbon support as shown in the following Chemical Formula 1:

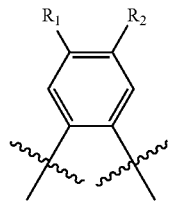

[Chemical Formula 1]

wherein $R_1$ and $R_2$ are the same or different, and each is independently selected from H, F and C1-C6 alkyl groups.

In another aspect, there is provided an electrode for a fuel cell, membrane-electrode assembly for a fuel cell, fuel cell or an instrument including the aryne-grafted carbon-supported catalyst according to an embodiment of the present disclosure.

In still another aspect, there is provided a method of preparing the aryne-grafted carbon-supported catalyst according to an embodiment of the present disclosure.

According to various embodiments of the present disclosure, it is possible to form a covalent bonding selectively to a carbon support of a fuel cell catalyst in a solution by using 2-(trimethylsilyl)phenyl triflate or the like. In addition, the formed anchor prevents adhesion of metal catalyst particles of a fuel cell, and thus improves the durability of a fuel cell catalyst.

BRIEF DESCRIPTION OF THE DRAWINGS

FIG. 2A shows AG-Pt/HC catalyst and FIG. 2B shows Pt/HC catalyst.

DETAILED DESCRIPTION OF EMBODIMENTS

Figure 1:
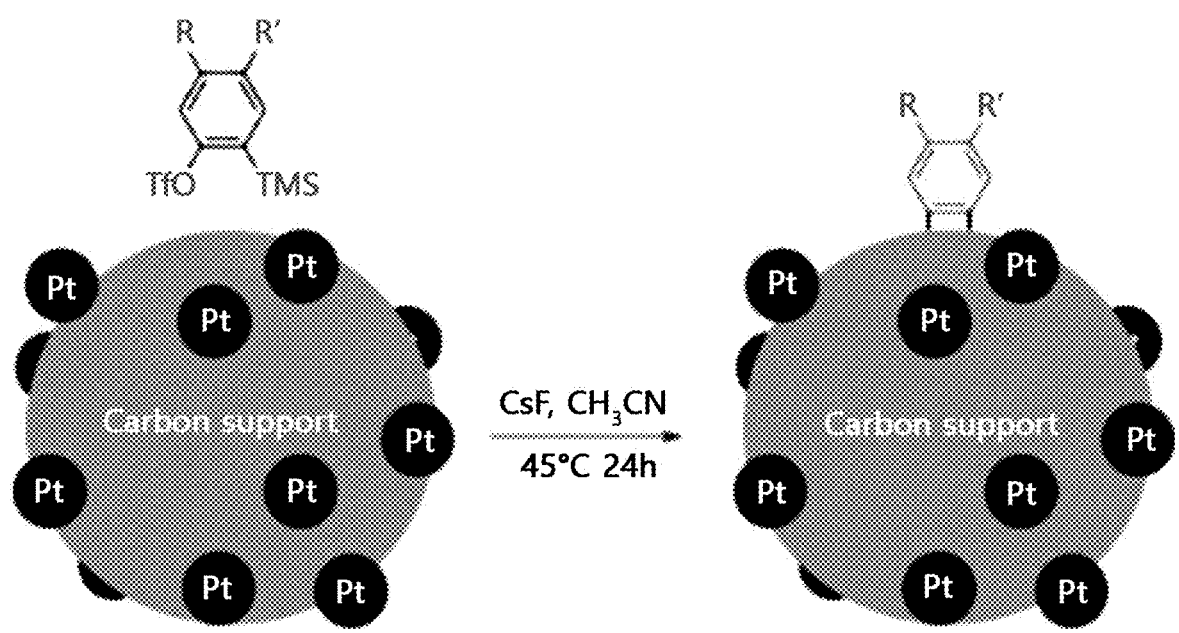
FIG. 1 shows a process of preparing a benzyne-grafted Pt/C catalyst.

Hereinafter, various aspects and embodiments of the present disclosure will be explained in more detail.

In one aspect, there is provided an aryne-grafted carbon-supported catalyst including a carbon support and a plurality of metal catalysts supported on the carbon support, wherein a plurality of arynes is grafted to the carbon support to form a structure bound to the carbon support as shown in the following Chemical Formula 1:

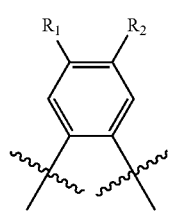

[Chemical Formula 1]

wherein $R_1$ and $R_2$ are the same or different, and each is independently selected from H, F and C1-C6 alkyl groups;

and the bonding to the surface of the carbon support occurs at the two sites marked by wavy lines simultaneously.

After carrying out analysis based on thermogravimetric analysis (TGA), aryne may be present in an amount of 52 wt % or less based on the total weight of the aryne-grafted carbon-supported catalyst, or in an amount of 26 wt % or less based on the total weight of the catalyst.

According to an embodiment, both $R_1$ and $R_2$ are H.

When both $R_1$ and $R_2$ are H, it is shown that the catalyst undergoes no degradation of initial catalytic performance caused by aryne grafting, unlike the other combinations of substituents which show slight degradation of initial catalytic performance due to aryne grafting.

According to another embodiment, the metal is selected from Pt, Pd, Ni, Co, Fe, Cu and alloys of two or more of them.

In another aspect, there is provided an electrode for a fuel cell which includes the aryne-grafted carbon-supported catalyst according to an embodiment of the present disclosure.

Particularly, such an electrode may be used as a cathode for a fuel cell.

In still another aspect, there is provided a membrane-electrode assembly for a fuel cell which includes the aryne-grafted carbon-supported catalyst according to an embodiment of the present disclosure.

In still another aspect, there is provided a fuel cell including the aryne-grafted carbon-supported catalyst according to an embodiment of the present disclosure.

In still another aspect, there is provided an instrument including the aryne-grafted carbon-supported catalyst according to an embodiment of the present disclosure.

According to the present disclosure, particular examples of the instrument include transport instruments, power supplying instruments, electronic appliances, electric motors, or the like, but are not limited thereto. Particularly, the fuel cell may be used for both fixed and portable power supplying sources, such as electronic appliances and auxiliary power units (APU), and particularly for power engines in transport means, such as cars, airplane and ships, or APU related thereto.

In yet another aspect, there is provided a method of preparing an aryne-grafted carbon-supported catalyst, including the steps of:

(A) dispersing a carbon-supported catalyst to a solution containing a compound represented by the following Chemical Formula 2 dissolved in a solvent to obtain a dispersion:

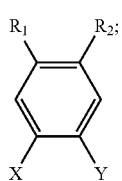

[Chemical Formula 2]

(B) introducing at least one reaction catalyst to the dispersion to carry out aryne cycloaddition; and (C) separating and recovering a carbon-supported catalyst including the compound represented by Chemical Formula 2 grafted to the carbon support as shown in the following Chemical Formula 1, after the completion of the reaction:

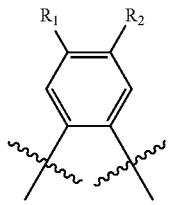

[Chemical Formula 1]

In Chemical Formulae 1 and 2, $R_1$ and $R_2$ are the same or different, and each may be independently selected from H, F and C1-C6 alkyl groups;

—X is selected from —Si(CH$_3$)$_3$ and —F; and

—Y is selected from —O—SO$_2$—CF$_3$ and —H.

According to an embodiment, the reaction catalyst is at least one selected from CsF, Mg and KF.

According to another embodiment, the solvent is at least one selected from CH$_3$CN and THF.

According to still another embodiment, the carbon-supported catalyst and the compound represented by Chemical Formula 2 are introduced at a ratio of 1:0.1-1.

When the ratio is less than 1:0.1, anchors grafted to the carbon support are too insufficient to prevent adhesion of particles. When the ratio exceeds 1:1, the compound represented by Chemical Formula 2 does not totally participate in the reaction, thereby causing loss of a reagent.

The examples and experiments will now be described. The following examples and experiments are for illustrative purposes only and not intended to limit the scope of this disclosure. In addition, it will be apparent to those skilled in the art that the present disclosure can be carried out with ease based on the description, including the examples, of the present disclosure, even though no particular experimental results thereof is not suggested herein, and that various changes and modifications may be made without departing from the spirit and scope of the disclosure as defined in the following claims.

Further, the experimental results described below are merely typical results of the examples and experiments. The effect of each of various embodiments not specified below will be described in detail at the corresponding part.

EXAMPLES

Example 1: Preparation of Benzyne-Grafted Pt/C Catalyst 2-(Trimethylsilyl)phenyl triflate, CsF and a carbon-supported platinum (Pt/C) catalyst were allowed to react in an acetonitrile solution to obtain a benzyne-grafted Pt/C catalyst (see, FIG. 1). Particularly, 0.0746 g of 2-(trimethylsilyl) phenyl triflate was dissolved into 100 mL of acetonitrile. Next, 0.2 g of a Pt/C catalyst was mixed with the solution and ultrasonication was carried out to obtain a dispersion, and then 0.075 g of CsF was introduced thereto and reaction was carried out at 45° C. for 24 hours. After the reaction mixture was separated by using a filter, it was washed with acetonitrile, ethanol and distilled sequentially. Then, the reaction product was dried to obtain a benzyne-grafted Pt/C catalyst.

Test Example 1: Analysis of Benzyne-Grafted Pt/C Catalyst

Figure 2A:
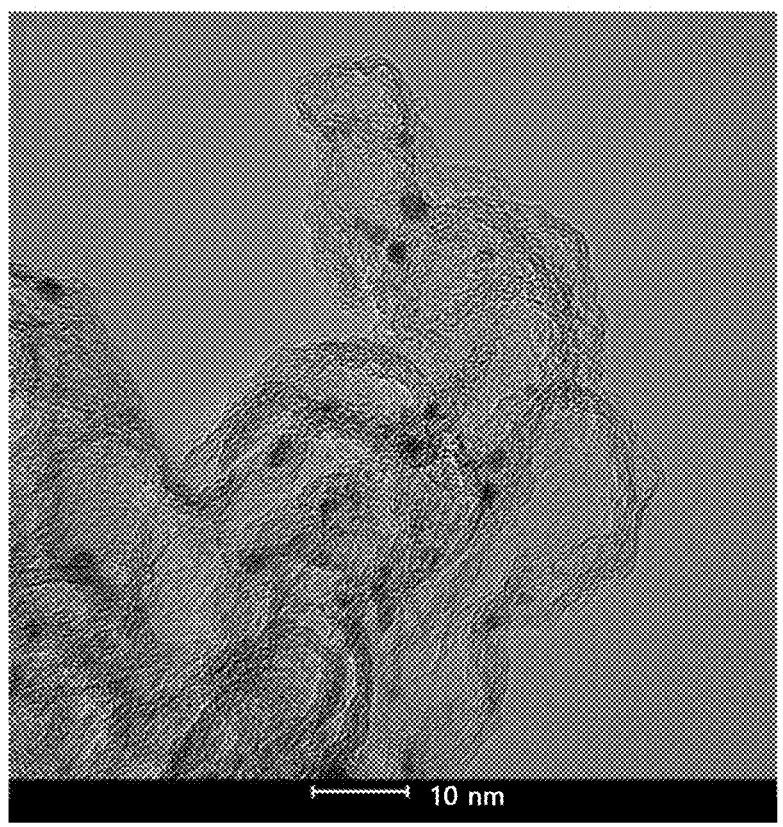
FIGS. 2A and 2B are transmission electron microscopic images.
Figure 2B:
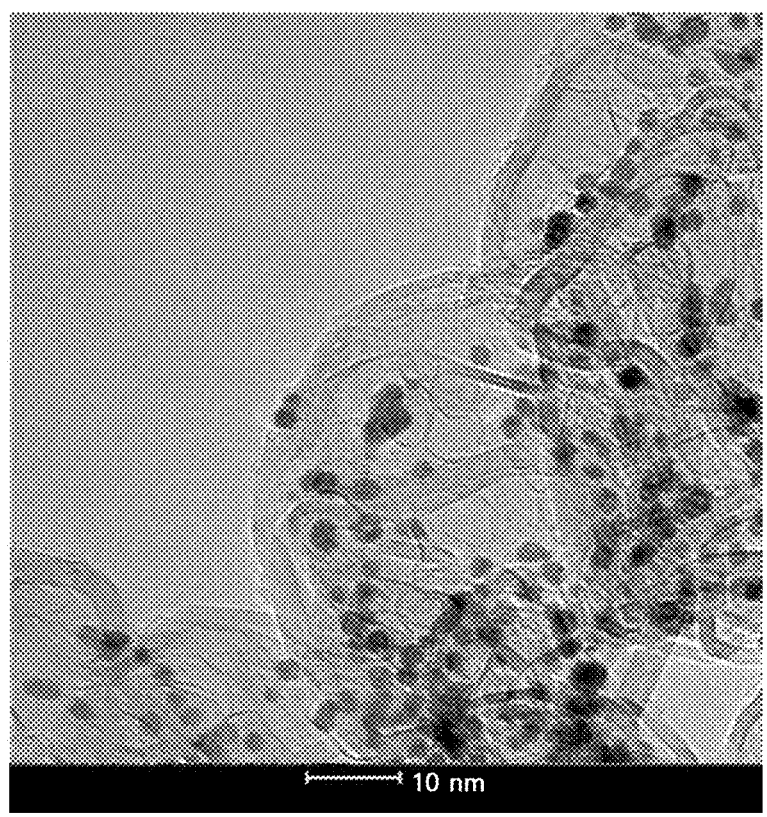

FIGS. 2A and 2B show the transmission electron microscopic images of the benzyne-grafted Pt/C catalyst obtained according to Example 1 (also referred to as 'AG-Pt/HC' hereinafter) and that of the non-treated Pt/C catalyst (also referred to as 'Pt/HC' hereinafter). It can be seen from FIG. 2A that an organic layer is formed on the surface of the carbon carried through the benzyne grafting. On the contrary, it can be seen from FIG. 2B that the surface of the carbon support in the non-treated Pt/HC catalyst is relatively smooth and has no organic layer.

Figure 3:
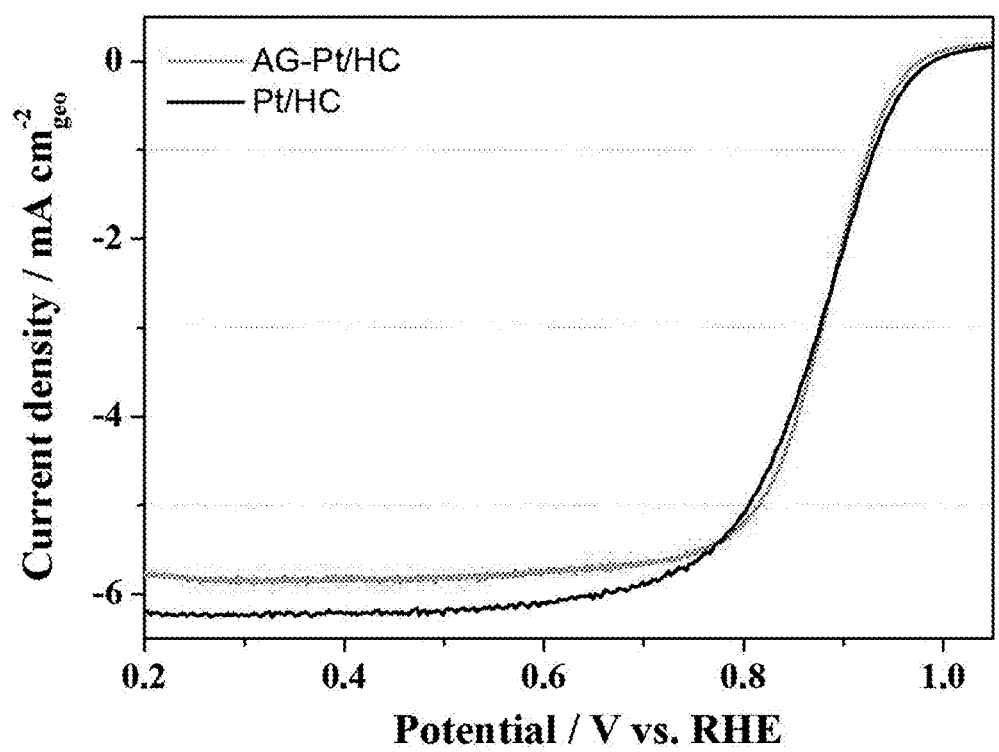
FIG. 3 shows the electrochemical oxygen reduction activity curves of AG-Pt/HC catalyst and Pt/HC catalyst.

FIG. 3 shows the electrochemical oxygen reduction activity curve of the benzyne-grafted Pt/C catalyst obtained according to Example 1 (AG-Pt/HC) and that of the non-treated Pt/C catalyst (Pt/HC). The electrochemical oxygen reduction activity was analyzed by using a tri-electrode system. Herein, silver/silver chloride (Ag/AgCl) was used as a reference electrode to control the potential of the catalyst. In addition, a platinum electrode was used as a counter electrode of the three electrode system to allow current flow. In the electrochemical oxygen reduction activity curves, the two samples show substantially the same performance. This suggests that benzyne grafting is bound to the carbon support merely while not affecting the surface of the platinum catalyst substantially.

Figure 4A:
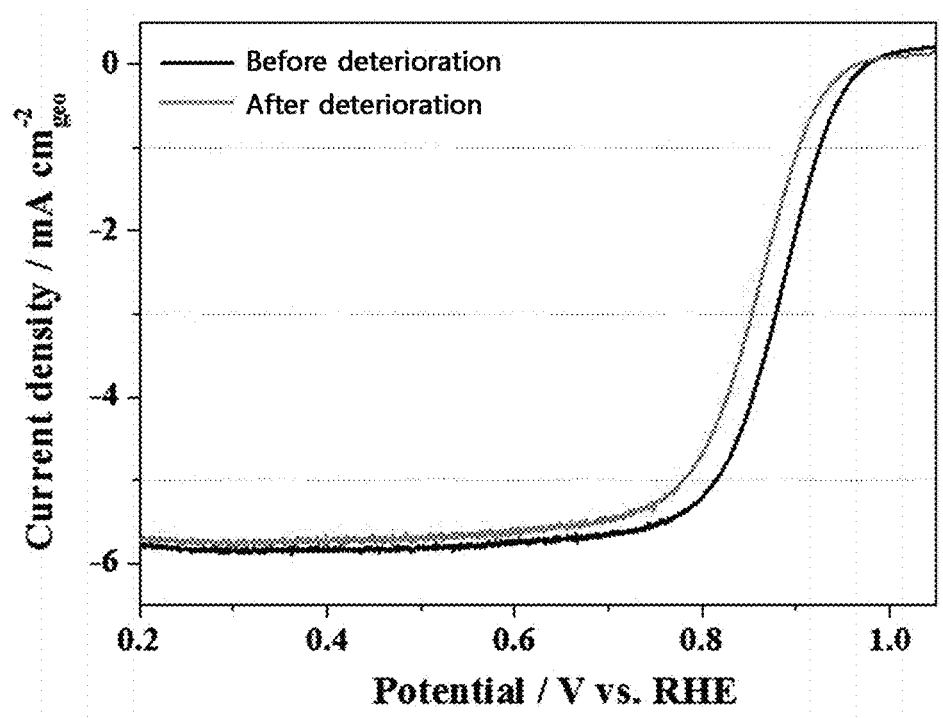
FIGS. 4A and 4B show the oxygen reduction activity curves of AG-Pt/HC catalyst and Pt/HC catalyst, before and after deterioration thereof.
Figure 4B:
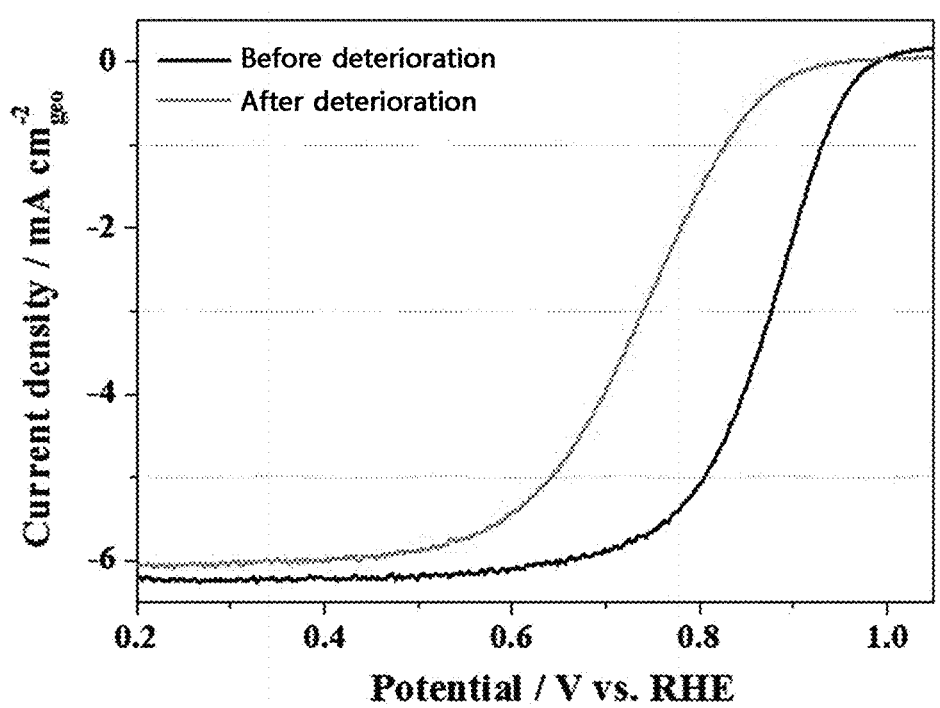

FIG. 4A and FIG. 4B show the test results of durability in oxygen reduction for AG-Pt/HC and Pt/HC, respectively. The durability was evaluated by the comparison of oxygen reduction activity before and after an accelerated deterioration test. The accelerated deterioration of each catalyst was carried out by subjecting each catalyst to 30,000 times of potential cycling in a voltage range of 0.6-1.1V at a scan rate of 100 mV/s in 0.1M $HClO_4$ solution. After the accelerated deterioration, AG-Pt/HC shows a drop in performance of 38% merely (FIG. 2A), while Pt/HC shows a drop in performance of 93% (FIG. 2B). This demonstrates that benzyne grafting provides a catalyst with significantly improved durability.

It can be seen from the above analysis results that benzyne is grafted to form anchors selectively on the carbon support of a fuel cell catalyst, and thus improves the durability of the fuel cell catalyst significantly.

What is claimed is:

1. A method of preparing an aryne-grafted carbon-supported catalyst, comprising the steps of:
   (A) dispersing a carbon-supported platinum (Pt/C) catalyst to a solution containing a compound represented by the following Chemical Formula 2 dissolved in a solvent to obtain a dispersion:

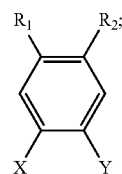

[Chemical Formula 2]

(B) introducing at least one reaction catalyst to the dispersion to carry out aryne cycloaddition; and
   (C) separating and recovering a compound represented by Chemical Formula 1 modified the carbon-supported platinum (Pt/C) catalyst after the completion of a reaction:

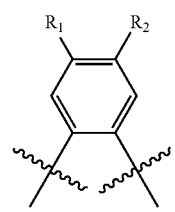

[Chemical Formula 1]

wherein $R_1$ and $R_2$ are the same or different, and each is independently selected from the group consisting of H, F and C1-C6 alkyl groups;
   —X is selected from —$Si(CH_3)_3$ and —F;
   —Y is selected from —O—$SO_2$—$CF_3$ and —H; and
   bonding to the carbon support occurs at two sites marked by wavy lines,
   wherein the reaction catalyst is at least one selected from CsF, Mg and KF, and the solvent is at least one selected from $CH_3CN$ and THF.

2. The method of preparing an aryne-grafted carbon-supported catalyst according to claim 1, wherein the carbon-supported catalyst and the compound represented by Chemical Formula 2 are introduced at a weight ratio of 1:0.1-1.

* * * * *